(12) United States Patent
Cong et al.

(10) Patent No.: US 8,037,033 B2
(45) Date of Patent: Oct. 11, 2011

(54) LOG MANAGER FOR AGGREGATING DATA

(75) Inventors: Shi Cong, Issaquah, WA (US); Karan Mehra, Sammamish, WA (US); Darren G. Moss, Redmond, WA (US); William R. Tipton, Seattle, WA (US); Surendra Verma, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 457 days.

(21) Appl. No.: 12/235,080

(22) Filed: Sep. 22, 2008

(65) Prior Publication Data
US 2010/0082918 A1    Apr. 1, 2010

(51) Int. Cl.
*G06F 17/30* (2006.01)
(52) U.S. Cl. .......................... 707/687; 707/661
(58) Field of Classification Search ................... None
See application file for complete search history.

(56) References Cited

U.S. PATENT DOCUMENTS

| | | |
|---|---|---|
| 6,148,368 A | 11/2000 | DeKoning |
| 6,629,198 B2 | 9/2003 | Howard et al. |
| 7,010,645 B2 | 3/2006 | Hetzler et al. |
| 7,257,690 B1 | 8/2007 | Baird |
| 7,376,796 B2 | 5/2008 | Corbett et al. |
| 2003/0055809 A1* | 3/2003 | Bhat ................................ 707/1 |
| 2005/0120036 A1* | 6/2005 | Verma et al. .................... 707/100 |
| 2006/0020634 A1* | 1/2006 | Huras et al. ..................... 707/200 |
| 2006/0184498 A1* | 8/2006 | Meyer et al. ....................... 707/1 |
| 2006/0236029 A1 | 10/2006 | Corrado et al. |
| 2006/0277153 A1 | 12/2006 | Mason et al. |
| 2007/0061279 A1 | 3/2007 | Christiansen et al. |
| 2007/0220326 A1 | 9/2007 | Ninose et al. |
| 2007/0220328 A1 | 9/2007 | Liu et al. |
| 2007/0260919 A1* | 11/2007 | Kerner et al. ..................... 714/15 |
| 2008/0162812 A1 | 7/2008 | Stroberger et al. |

OTHER PUBLICATIONS

Kiswany, et al., "stdchk: A Checkpoint Storage System for Desktop Grid Computing", Retrieved at<<http://arxiv.org/ftp/arxiv/papers/0706/0706.3546.pdf>>, pp. 1-13.

Chen, Peter M., "Optimizing Delay in Delayed-Write File Systems", Retrieved at<<http://www.eecs.umich.edu/~pmchen/papers/chen96_2.pdf>>, In Proceedings of the 1994 International Conference on Architectural Support for Programming Languages and Operating Systems (ASPLOS), Oct. 1994. pp. 1-12.

(Continued)

*Primary Examiner* — Mohammad Ali
*Assistant Examiner* — Syed H Hasan
(74) *Attorney, Agent, or Firm* — Capitol City TechLaw; Richard C. Irving

(57) ABSTRACT

A processing device and a machine-implemented method may be provided for sequentially aggregating, or writing, data to a log included in a data store. The log may store multiple log entries. Each of the log entries may include an entry metadata portion, describing a respective log entry, and an entry payload data portion. The entry metadata portion may include a log sequence number, corresponding to a log entry at a particular position in the log. A library of log-related processes may be provided, along with an application program interface to permit a calling application program to call any of the log related processes. The log-related processes may be called during a boot mode, a user mode, and a kernel mode.

20 Claims, 14 Drawing Sheets

OTHER PUBLICATIONS

Dai, et al., "ELF: An Efficient Log-Structured Flash File System for Micro Sensor Nodes", Retrieved at<<http://mantis.cs.colorado.edu/media/sensys_elf_external.pdf>>, To appear, ACM SenSys 2004, SenSys'04, Nov. 3-5, 2004, Baltimore, Maryland, USA. pp. 12.

U.S. Appl. No. 12/234,411, "Aggregation of Write Traffic to a Data Store", filed Sep. 19, 2008.
U.S. Appl. No. 12/121,776, "Optimizing Write Traffic to a Disk", filed May 15, 2008.

* cited by examiner

LOG MANAGER FOR AGGREGATING DATA

BACKGROUND

Data may reside over a wide range of addressable storage space of a data store. With respect to some data stores, data may only be written incrementally through addressable storage space. With respect to random access data stores, such as, for example, disks and flash-based storage, data may be written in any order to any storage location. Although writing data in any order to any storage location may be convenient, often this approach is not very efficient for writing to the random access data stores. A most efficient approach for writing data to a random access data store is sequential writing of the data.

A random access data store, such as, for example, a modern disk drive, may be capable of moving approximately 700 kilobytes (KB) of data in an amount of time taken for the disk drive to seek an arbitrary location on a disk. As technology advances, disk drives may be capable of moving larger amounts of data during a same time period.

Most data transfers are much smaller than 700 KB. As a result, disk drives may spend a significant amount of time seeking locations on disks during non-idle time periods.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A processing device and a machine-implemented method may be provided for sequentially aggregating, or writing, data to a log included in a data store. The log may include multiple log entries, each of which may include an entry metadata portion, which may include metadata describing a respective log entry, and an entry payload data portion, including data. The entry metadata portion may include a log sequence number, corresponding to a log entry at a particular position in the log, as well as other data.

In one embodiment, a log sequence number may include a wrap count portion, indicating a number of times entries in the log wrapped past a physical end of the log, and an offset portion, indicating an offset, in a predefined unit, with respect to a physical beginning of the log. In some embodiments, the predefined unit may be a sector.

The log may include a number of cells, each of which may have a predefined storage size and may store multiple log entries and a cell summary. The cell summary may include information regarding only the multiple log entries stored in a respective cell.

The log may further include one or more log control areas, each of which may include information, such as, for example, information pertaining to a logical start of the log, a wrap count indicating a number of times wrapping past a physical end of the log occurred, as well as other information.

A library of log-related processes may be provided, along with an application program interface to permit a calling application program to call any of the log related processes. The log-related processes may be called during a boot mode, a user mode, and a kernel mode.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
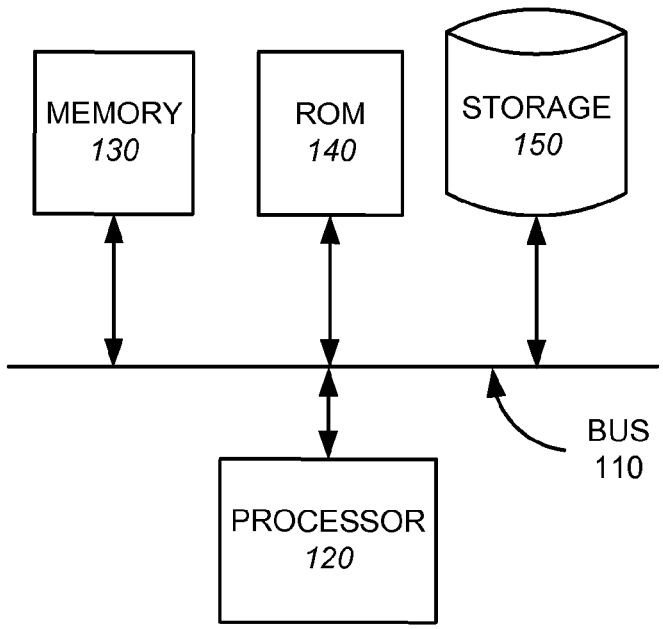
FIG. 1 illustrates a functional block diagram of an exemplary processing device, which may be used to implement embodiments consistent with the subject matter of this disclosure.

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

A machine-implemented method and a processing device are provided for sequentially aggregating data to a log residing in a data store. In embodiments consistent with the subject matter of this disclosure, the log may be stored: (1) within a file included in a volume of a random-access medium; (2) within a complete or partial volume of a random-access medium, which is not used by a file system, or (3) a complete or partial random-access medium, which is not used as a volume. The log may be a circular storage area for storing a number of log entries. That is, as a physical end of the log is reached, the log may continue by wrapping to a physical beginning of the log. Each of the stored log entries may include an entry metadata portion and an entry payload data portion. The entry metadata portion may include metadata describing a respective log entry, such as, for example, a log sequence number (LSN), a length of the respective log entry, as well as other data.

The LSN may correspond to a log entry at a particular position in the log. For example, in one embodiment, the LSN may include a wrap count portion and an offset portion. The wrap count portion is a count of a number of times wrapping of the log occurs. The offset portion is an offset, in predefined storage units, with respect to a physical beginning of the log. The predefined storage units may be, for example, sectors or another storage unit.

The log may include a number of cells. Each of the cells may have a predefined storage size and may store multiple log entries and a cell summary, including information describing log entries included in a respective cell. In some embodiments, the cell summary may include information describing only the log entries included in the respective cell. A cell summary may be written to a respective cell when the cell no longer has a capacity to hold an additional log entry, or when the cell has less than a predefined amount of available storage.

The log may include at least one log control area (LCA), which may further include a logical starting address of a beginning of the log and a wrap count. In some embodiments, the logical starting address may be a LSN corresponding to a logical beginning of the log. The LCA may reside at a physical beginning of the log or at a physical end of the log. In some embodiments, the log may include a first LCA at the physical beginning of the log and a second LCA at the physical end of the log. In such embodiments, if one LCA becomes corrupted, another LCA may be usable.

A library of log-related processes may be provided. The library of log-related processes may be called a log manager and may include, but not be limited to, a process for initializing the library, a process for opening a log, a process for reading a log entry, a process for writing a log entry, a process for closing a log, a process for obtaining information with respect to a fullness of a log, a process for advancing a logical starting address of a log, and a process for setting a logical ending address of a log. In other embodiments, the library of log-related processes may include different or additional log-related processes. An application program interface (API) may be provided, such that an application program may call any of the log-related processes included in the library and may receive one or more notifications regarding a status of a log-related operation and/or a status of a log.

Exemplary Processing Device

FIG. 1 is a functional block diagram of an exemplary processing device 100, which may be used to implement embodiments consistent with the subject matter of this disclosure. Processing device 100 may be a desktop personal computer (PC), a notebook or laptop PC, a server, or other processing device. Processing device 100 may include a bus 110, a memory 130, a read only memory (ROM) 140, a processor 120, and a storage device 150. Bus 110 may permit communication among components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may store temporary variables or other intermediate information used during execution of instructions by processor 120. ROM 140 may include a conventional ROM device or another type of static storage device that stores static information and instructions for processor 120. Storage device 150 may include a hard disk and corresponding drive, a flash-based storage device, or other type of data storage device or medium for storing data and/or instructions for processor 120.

Processing device 100 may perform functions in response to processor 120 executing sequences of instructions contained in a tangible machine-readable medium, such as, for example, memory 130, ROM 140, storage device 150 or other medium. Such instructions may be read into memory 130 from another machine-readable medium or from a separate device via a communication interface (not shown).

Log

Figure 2:
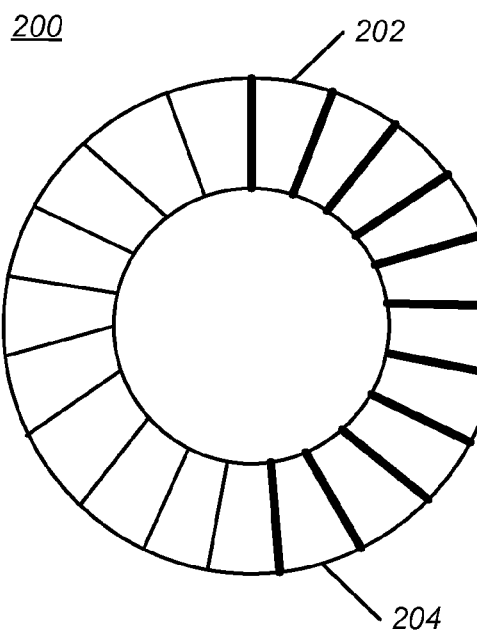
FIG. 2 illustrates exemplary circular storage area for storing a log in embodiments consistent with the subject matter of this disclosure.

In embodiments consistent with the subject matter of this disclosure, a log, for sequentially aggregating data, may be a circular storage area residing on a medium, such as, for example, a disk, a flash drive, or other medium. FIG. 2 illustrates an exemplary log 200. Log 200 may include multiple log entries, including a starting log entry 202 and an ending log entry 204. Starting entry 202 may be an oldest entry of log 200, while ending entry 204 may be a newest entry of log 200. That is, new entries may be appended to log 200 after ending log entry 204, and ending log entry 204 may be updated to correspond to a newest of the appended log entries.

Figure 3:
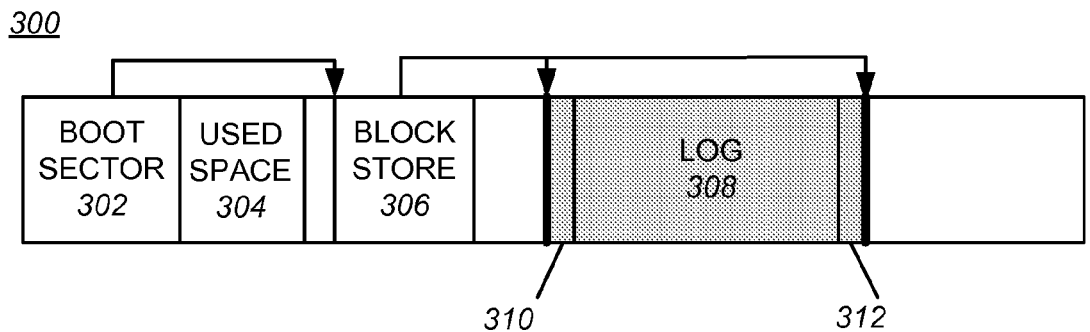
FIG. 3 illustrates an exemplary log stored on a medium.

FIG. 3 illustrates exemplary structures which may be stored on a medium 300 consistent with the subject matter of this disclosure. Medium 300 may include a boot sector 302, a block store structure 306, and a log 308 recorded on medium 300. Boot sector 302 may include a pointer to block store structure 306. Block store structure 306 may include information with respect to an area of medium 300 which is not to be used by a file system. The area may correspond to an area reserved for log 308 for sequentially aggregating data.

Log 308 may include a first LCA 310 and/or a second LCA 312, which may be located at a beginning and/or an end, respectively, of log 308. First and second LCAs 310, 312 may include information about log 308 including, but not limited to, information about a starting entry of log 308, a wrap count of log 308, and a wrapping LSN of log 308 (to be described below). In other embodiments, a LCA may include different or additional information. In some embodiments, the information about a starting entry may include a starting log sequence number (LSN), which may correspond to a log entry at a logical beginning of log 308.

Each log entry of log 308 may correspond to a LSN. A LSN may include a wrap count portion and an offset portion. For example, in one embodiment, a LSN may include a first 4-byte unsigned number and a second 4-byte unsigned number. A content of the first 4-byte unsigned number may be a wrap count and a content of the second 4-byte unsigned number may be an offset from a beginning of the log. The wrap count portion may be a number of occurrences of wrapping past a physical end of log 308. The offset portion may be an offset in sectors, or some other predefined storage unit, from a physical beginning of log 308.

A wrapping LSN may be a LSN, beyond which wrapping to a physical beginning of log 308 and incrementing of the wrap count may occur. For example, if the wrapping LSN is <wrap count>.400, where 400 is an offset from a physical beginning of log 308, then when a current LSN has reached, for example, 2.400, then wrapping to a physical beginning of write log 308 may occur and the current LSN may become 3.0.

Figure 4:
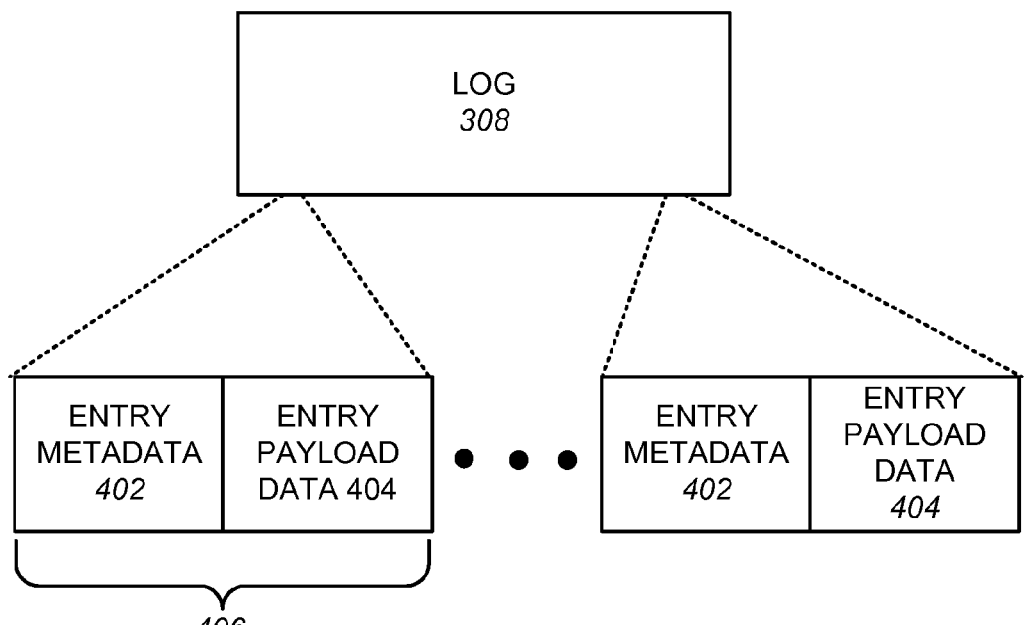
FIG. 4 illustrates a more detailed view of exemplary log entries of the log shown in FIG. 3.

Log 308 may include a number of log entries 406, as shown in FIG. 4. Each of log entries 406 may include entry metadata 402 and entry payload data 404. In some embodiments, entry metadata 402 and entry payload data 404 may be sector aligned.

Figure 5:
FIG. 5 illustrates an exemplary entry metadata portion of the log entries shown in FIG. 4.

FIG. 5 shows a more detailed view of entry metadata 402 in an embodiment consistent with the subject matter of this disclosure. Entry metadata 402 may include an entry header 502, a signature array 504, a record header 506, record metadata 508, and padding 510. Entry header 502 may include data identifying a beginning of a log entry 406. Signature array 504 may include information for verifying a validity of log entry 406. Record header 506 may include information such as, for example, a length of entry metadata 402. Record metadata 508 may include information, such as, for example, a LSN corresponding to log entry 406, and a length of log entry 406, as well as other information. Padding 510 may be padding of a length, such that entry payload data 404 of log entry 406 may be sector aligned.

In some embodiments, signature array 504 may include original contents of a predefined portion of each sector included in log entry 406. For example, in one embodiment, the predefined portion of each sector may be at least one byte at an end of each sector. The original contents of the predefined portion of each sector may be copied to signature array 504 and a respective sequence number may be written to the predefined portion of each sector. For an example, contiguous sectors of log entry 406 may include, respectively, sequence numbers 5, 6, 7, 8, . . . etc. stored in respective predefined portions of each contiguous sector. An unexpected value of any of the sequence numbers may indicate an invalid log entry. In some embodiments, the predefined portion of each sector may further include one or more flags. At least one of the one or more flags may indicate whether a respective sector of log entry 406 is a first sector of log entry 406, a middle sector of log entry 406, or a last sector of log entry 406. In some embodiments, the predefined portion of each sector may also include several least significant bits of a wrap count portion of a LSN corresponding to log entry 406.

In some embodiments, signature array 504 may include a checksum calculated over the log entry 406.

Figure 6:
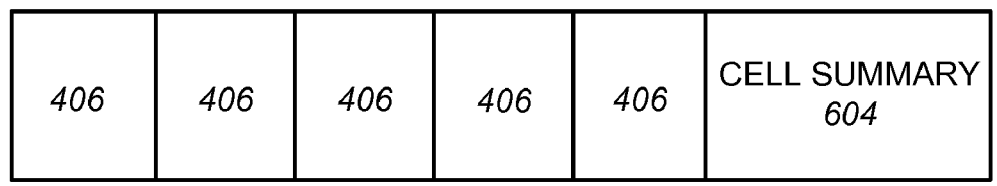
FIG. 6 illustrates an exemplary cell, which may be stored in a log consistent with the subject matter of this disclosure.

Log 308 may include one or more cells. Each of the one or more cells may be of a predetermined length, or size, and may include a number of log entries 406. FIG. 6 illustrates exemplary cell 600 having multiple log entries 406 and a cell summary 604. Cell summary 604 may include information about log entries 406 included in cell 600. In some embodiments, cell summary 604 may include information only about log entries 406 included in a same cell as cell summary 604.

A LSN corresponding to a logical end of a log may be called an End LSN and a LSN corresponding to a logical beginning of a log may be called a Start LSN. At times, a system may fail and restart. After restarting, a Start LSN of a log may be recovered from a LCA of the log. However, if the start LSN is invalid, then the log may no longer be accessed. An End LSN may not be stored in the LCA and may be lost after a restart.

Each cell summary may be stored at a predefined position within a respective cell. Upon restarting, cell summaries may be read until an invalid cell summary is found. Because completion of writing log entries may occur out of order, a gap of one or more invalid log entries may exist between valid log entries after a restart. Log entries, starting from a beginning log entry of a cell following a cell including a last found valid cell summary, may be read until no additional valid log entries may be found in the log. At this point, End LSN may be set to correspond to an end of a last read valid log entry.

Exemplary Processing

Figure 7:
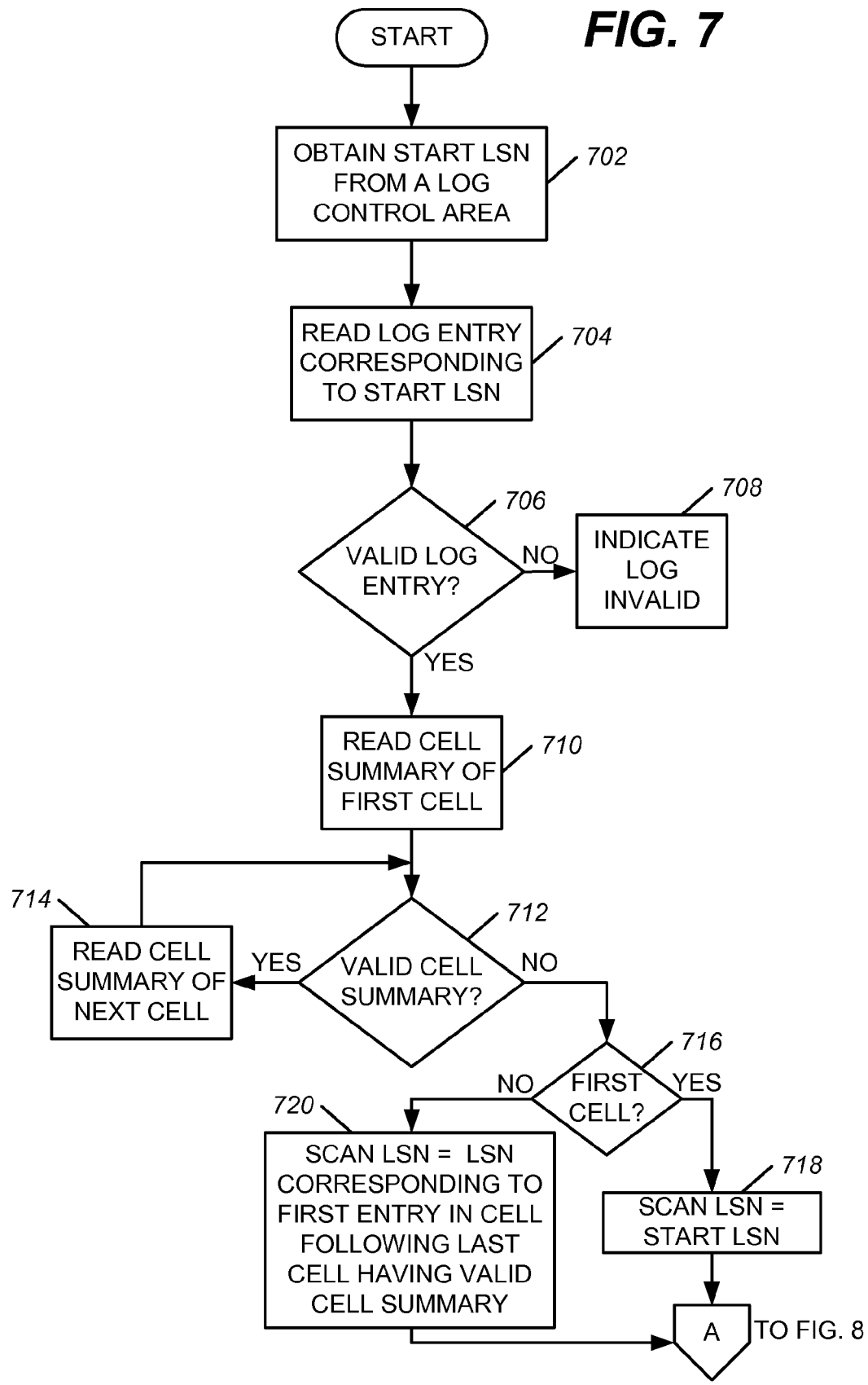
FIGS. 7 and 8 are flowcharts illustrating an exemplary process for finding and setting a logical end of a log after a system restart, in embodiments consistent with the subject matter of this disclosure.
Figure 8:
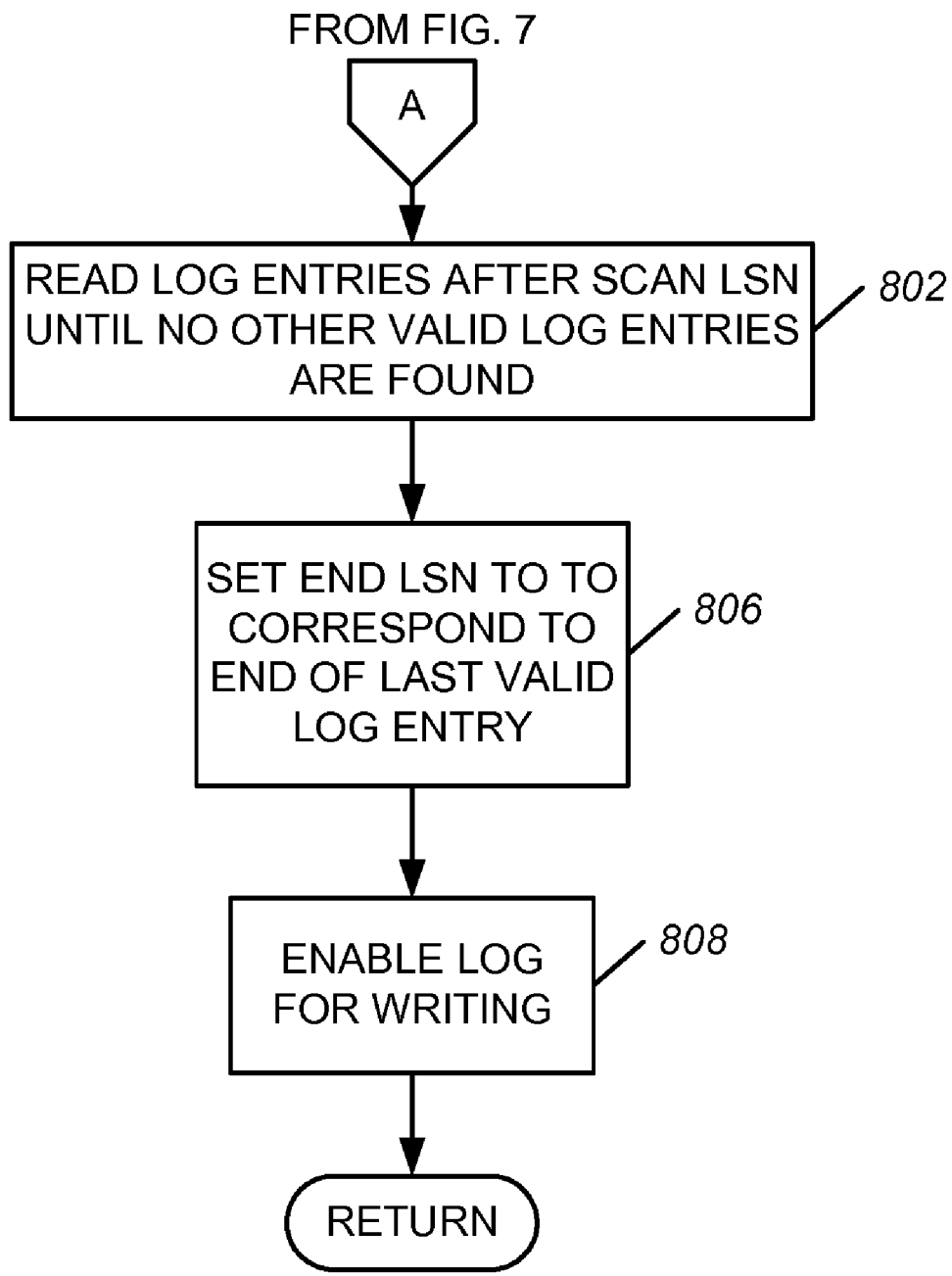

FIGS. 7 and 8 are flowcharts of an exemplary process for a finding a logical end of a log, after a system restart, and setting End LSN to correspond to the logical end of the log. Before End LSN is set, data may not be written to the log. The process may begin with a processing device obtaining a Start LSN of a log from a LCA of the log (act 702). The processing device may then read a log entry corresponding to Start LSN (act 704). The processing device may then determine whether the log entry is valid (act 706). This may be performed by checking a signature array of the log entry, along with predefined portions of sectors of the log entry, in some embodiments. In other embodiments, the log entry may include a checksum, calculated over the log entry, or other information that may be useful in determining a validity of the log entry.

If the log entry is determined to be invalid, because the log entry corresponds to a logical beginning of the log, Start LSN may be invalid and the log may be unrecoverable. The processing device may indicate that the log is invalid (act 708) when the log entry at the logical beginning of the log is invalid. Alternatively, Start LSN may be compared with an allowable range of LSNs for the log. If Start LSN is outside of the allowable range, then Start LSN may be determined to be invalid.

If, during act 706, the log entry is determined to be valid (or, alternatively, Start LSN is determined to be within the allowable range of LSNs for the log), then the processing device may read a cell summary of the cell (act 710). The processing device may determine whether the cell summary is valid (act 712) by examining content of the cell summary. Alternatively, because the cell summary is a log entry, a same method may be employed to determine a validity of the cell summary as was previously described regarding determining a validity of a log entry. If the cell summary is determined to be valid, then the processing device may read a cell summary of the next cell (act 714). If, during act 712, the cell summary is determined not to be valid, then the processing device may determine whether the cell is a first cell of the log (act 716). If the cell is determined to be the first cell of the log, then there are no cell summaries in the log and the processing device may set Scan LSN to be equal to Start LSN (act 718). If, during act 716, the processing device determines that the cell is not the first cell in the log, then the processing device may set Scan LSN to correspond to a position of a first log entry in the cell (act 720).

After performing act 718 or act 720, because writing of log entries may complete out of order, the processing device may read log entries, beginning with a log entry corresponding to Scan LSN, until no other valid log entries may be found (act 802; FIG. 8). Embodiments consistent with the subject matter of this disclosure, may scan forward an adjustable amount of disk space to jump over invalid, or dirty log entries between valid log entries. The processing device may then set End LSN to correspond to an end of a last found valid log entry (act 806). The processing device may then enable the log for writing (act 808).

Library of Log-Related Processes (Log Manager)

In some embodiments, a library of log-related processes may be provided along with an application program interface. The application program interface may permit an application program to call any of the log-related processes of the library. Further, the log-related processes may provide one or more notifications to the calling application program regarding a status of a log-related process, such as, success, failure, or another status, as well as a state of the log. The log-related processes may be called during a boot mode, a user mode, and a kernel mode. As an example, the exemplary process described with respect to FIGS. 7 and 8 may be performed by an application program calling log-related processes for obtaining a Start LSN of a log, for reading log entries and determining a validity of respective log entries, and for setting an End LSN of a Log.

Figure 9:
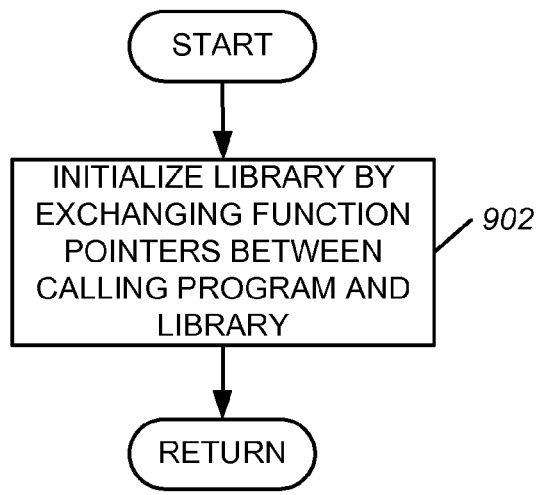
FIGS. 9-20 are flowcharts illustrating exemplary log-related processes, which may be included in a library, in embodiments consistent with the subject matter of this disclosure.

FIG. 9 is a flowchart of an exemplary log-related process for initializing a library of the log-related processes. The process may begin by exchanging a number of function pointers between a calling application program and an instantiation of the library (act 902). The process may then end.

Figure 10:
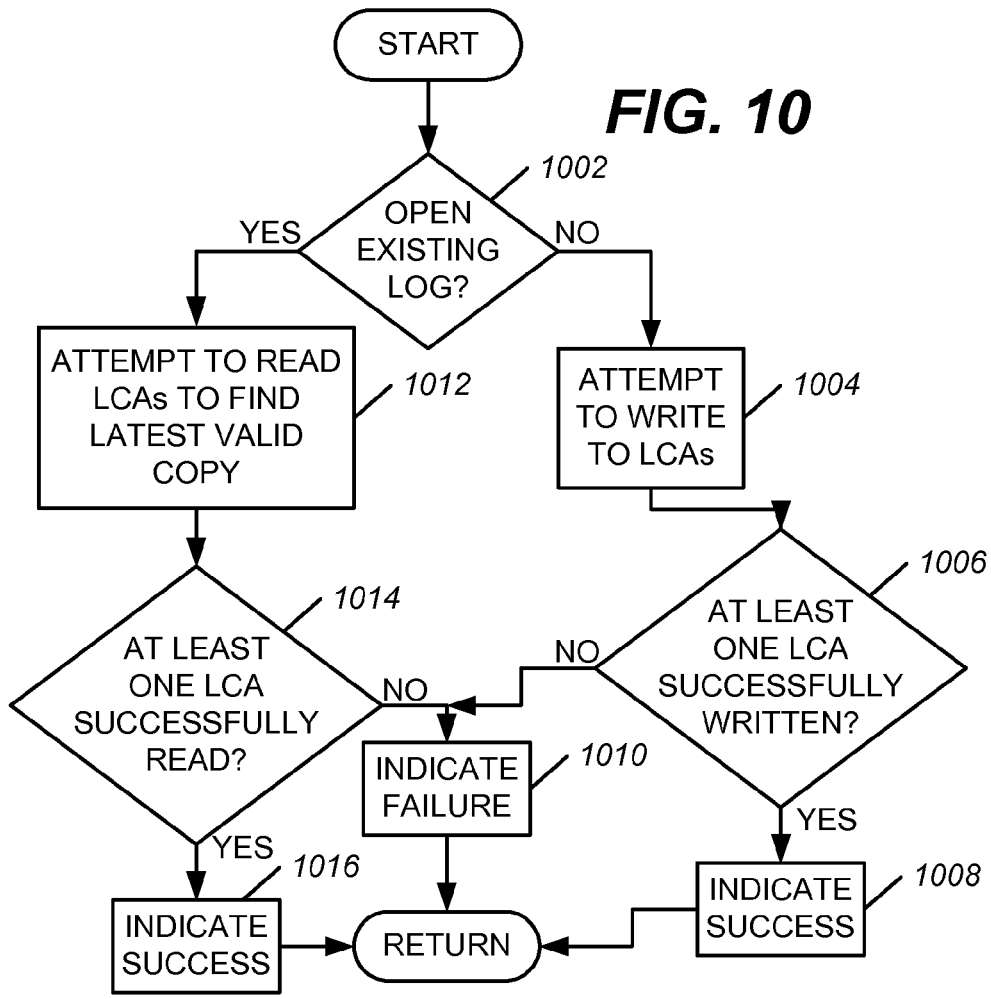

FIG. 10 is a flowchart of an exemplary log-related process for opening a log. The process may be called by a calling program that may provide a log handle indicating a log to open. A handle is a token, such as, for example, a pointer, that enables access to a resource, such as, for example, a log.

The log-related process may begin by determining whether the log to open is an existing log (act 1002). If the log is not an existing log, then the process may attempt to write information to any LCAs of the log (act 1004). For example, if the log has two LCAs, then the process may attempt to write information to the two LCAs. The process may then determine if the information was successfully written to at least one LCA (act 1006). The information may include a Start LCN corresponding to a logical beginning of the log, a wrap count of zero, a wrap LSN indicating a LSN corresponding to a position in the log beyond which wrapping of the log may occur, or other information. If the information was successfully written to at least one LCA, then the process may notify the calling program to indicate that the opening of the log completed successfully (act 1008). The process may then be completed.

If, during act 1006, the process determines that the information was not written to at least one LCA, then the process may notify the calling program to indicate that the opening of the log failed (act 1010). The process may then be completed.

If, during act 1002, the process determines that the log to open is an existing log, then the process may attempt to read the one or more LCAs to find a latest valid copy of information included in one or more of the LCAs (act 1012). The process may then determine whether at least one of the one or more LCAs was successfully read (act 1014). If at least one of the one or more LCAs was successfully read, then the process may notify the calling program to indicate that the opening of the log was successful (act 1016). Start LSN and/or other information included in the read one of the one or more LCAs may be obtained and provided to the calling program.

If, during act 1014, the process determines that all LCAs could not be successfully read, then the process may notify the calling program to indicate that the opening of the log failed (act 1010). The process may then be completed.

Figure 11:
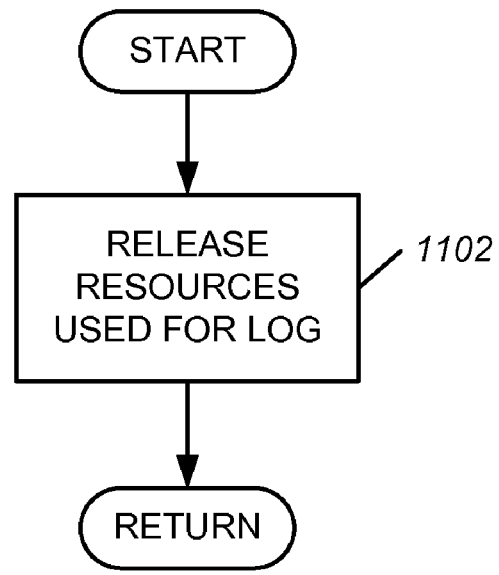

FIG. 11 is a flowchart illustrating an exemplary log-related process for closing a log. The process may be called by a calling program that may provide a log handle indicating a log to close. The process may begin by releasing any resources used for the log, such as the log handle, or other resource (acts 1102). The process may then be completed.

Figure 12:
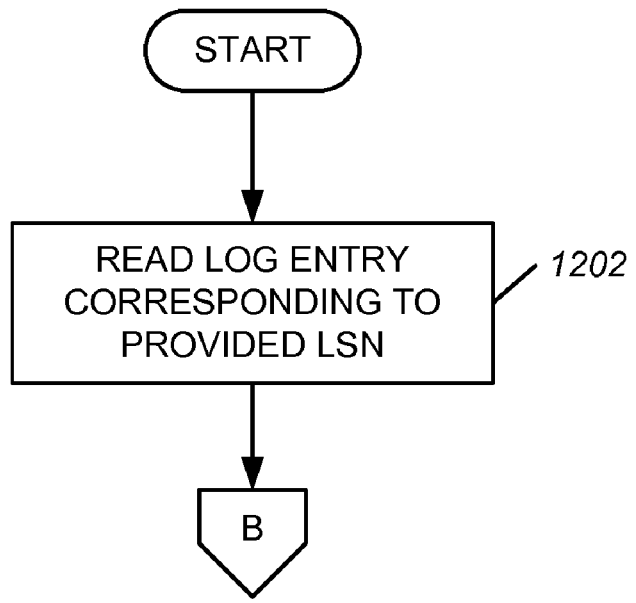
Figure 13:
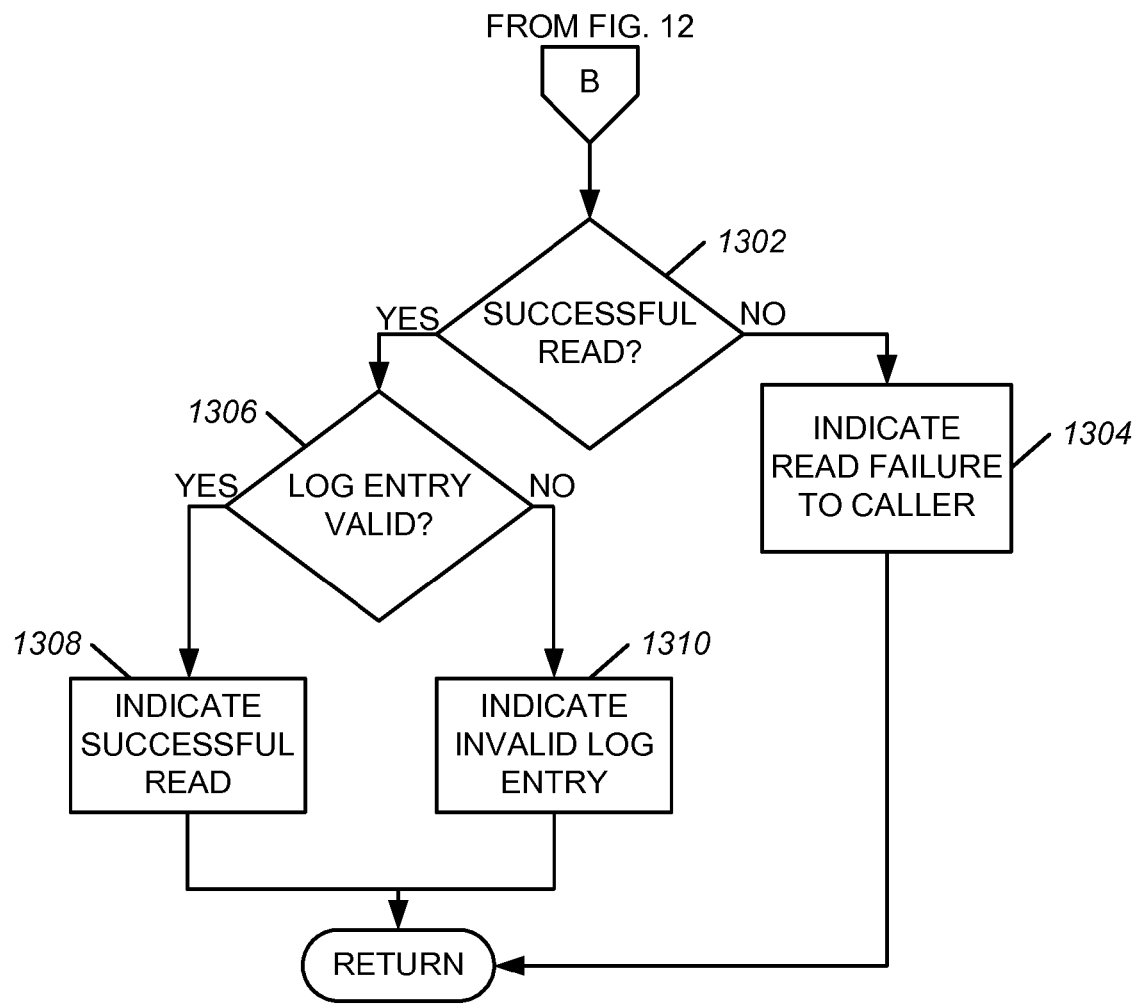

FIGS. 12 and 13 are flowcharts illustrating an exemplary log-related process for reading a log entry. A calling program may call the exemplary log-related process, providing the process with a LSN corresponding to a log entry to read. The process may began with an attempt to read a log entry corresponding to the provided LSN (act 1202). The process may then determine whether the reading of the log entry was successful (act 1302; FIG. 13). If the reading of the log entry was not successful, then a notification may be provided to the calling program indicating a read failure (act 1304). The process may then be completed.

If, during act 1302, the process determines that the reading of the log entry was successful, then the process may determine whether the read log entry is valid (act 1306). The process may determine whether the log entry is valid by accessing a signature array in an entry metadata portion of the log entry, by accessing respective predefined portions of each sector of the log entry to determine whether any of the predefined portions have an unexpected sequence number, by performing a checksum calculation over the log entry and comparing a checksum included in the signature array with a result of the checksum calculation, or by another method.

If, during act 1306, the process determines that the log entry is valid, then the process may return a notification to the calling program indicating a successful read (act 1308) and the process may be completed. Data from the read log entry may be provided to the calling program.

If, during act 1306, the process determines that the read log entry is not valid, then the process may return a notification to the calling program indicating that the read log entry is invalid (act 1310). The process may then be completed.

When reading a log entry, a read operation may fail due to a bad sector. When a read operation fails due to a bad sector, a log-related process performing the read operation may provide a notification to a calling program indicating a read failure due to a bad sector.

A drain read is a read operation in which a log entry is read, payload data of the log entry may be moved to another location outside of the log, and the log entry in the log may be discarded. If the calling program calls the log-related process to perform a drain read and the drain read fails due to a bad sector, then the calling program may call a log-related process to write a bad sector entry to a log entry corresponding to a logical end of the log. The bad sector entry may indicate an area of the log having the bad sector. The bad sector entry may remain in the log until disk space the bad sector entry describes is over-written. By keeping track of bad sectors, a possibility of data corruption may be decreased or eliminated and a Start LSN of the log may later be changed to correspond to another log entry beyond the bad sector entry. For example, a calling program may determine that a log entry has bad sectors during draining. The calling program may write a new bad sector entry into the log to indicate that the disk space described by the log entry is unavailable due to bad sectors. Any subsequent read of the log entry may fail with a bad sector error code. The calling program may then change Start LSN to correspond to another log entry beyond the log entry having the bad sectors. The calling program may also determine that a current log entry being drained is a bad sector entry. The calling program then may rewrite the bad sector entry to the end of the log and may change Start LSN to correspond to another log entry beyond the bad sector entry.

Figure 14:
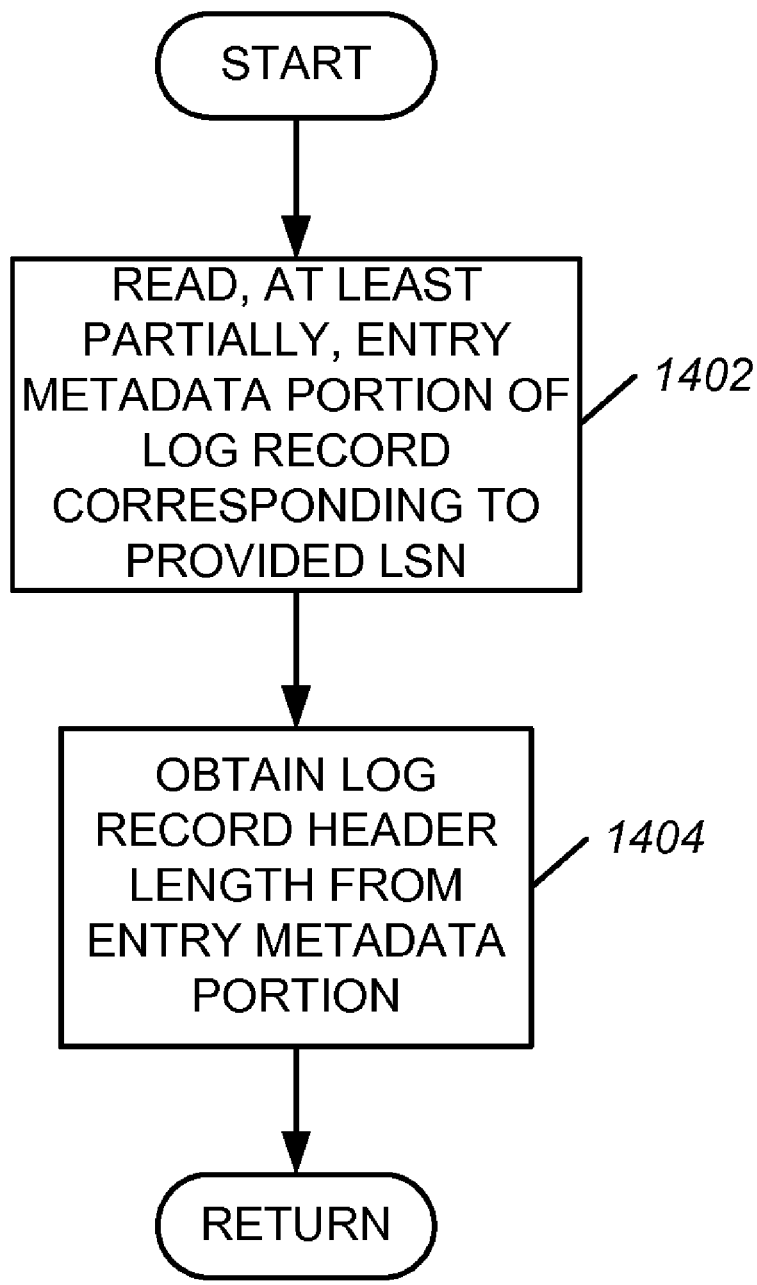

FIG. 14 is a flowchart illustrating an exemplary log-related process for obtaining a log record header length from an entry metadata portion of a log entry corresponding to a LSN provided by a calling program. The calling program may provide an indication of a log via a log handle and may provide a LSN corresponding to a log entry. The process may begin by reading, at least partially, an entry metadata portion of the log entry corresponding to the provided LSN (act 1402). The log-related process may obtain the record header length from the entry metadata portion of the log entry (act 1404) and may return a value of the record header length to the calling program.

Figure 15:
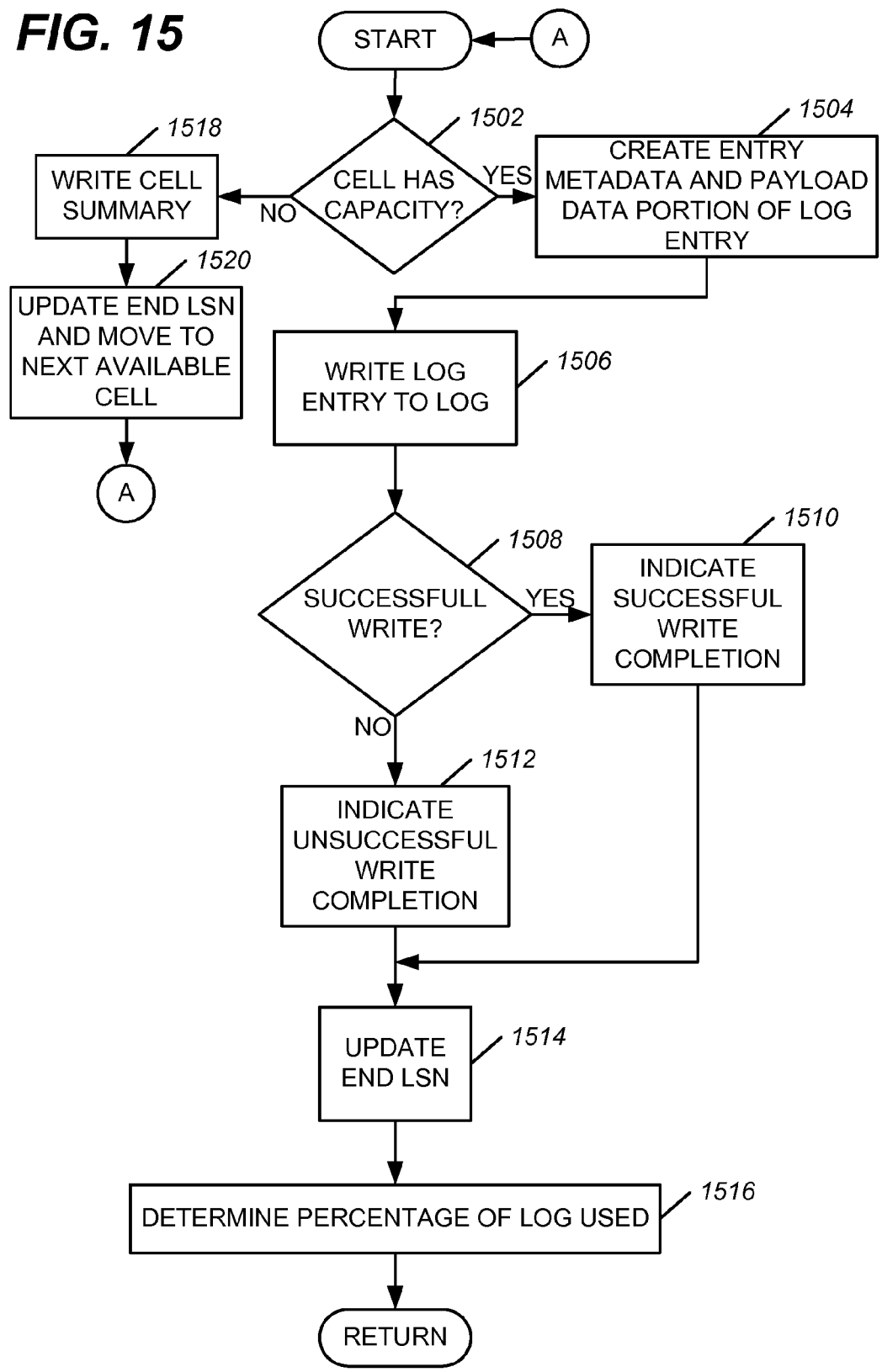

FIG. 15 is a flowchart illustrating an exemplary log-related process for writing a log entry to a log. An address of a buffer, including data to write to a log, and a log handle may be provided by the calling program. The process may begin with determining whether a cell has enough capacity for storing the log entry (act 1502). If the process determines that the cell does not have the capacity, the process may write the cell summary in a predefined position of the cell (act 1518). In some embodiments, the predefined position may be at an end of the cell. However, in other embodiments, the cell summary may be stored at a different position within the cell. The process may then update End LSN, such that End LSN corresponds to an end of the cell and a next log entry may be stored in a next available cell (act 1520).

If, during act 1502, the process determines that the cell has enough capacity for storing the log entry, or after performing acts 1518 and 1520, the process may create an entry metadata portion and a payload data portion of the log entry (act 1504). As previously mentioned, the entry metadata portion may include a signature array or another mechanism for determining validity of the log entry.

Next, the process may attempt to write the log entry to a logical end of the log, which may correspond to End LSN (act 1506). The process may then determine whether the log entry was successfully written to the log (act 1508). If the log entry was successfully written, the process may notify the calling program that the write completed successfully (act 1512). If, during act 1508, the process determines that the log entry was not successfully written, then the process may notify the calling program about the unsuccessful write completion (act 1512).

The process then may update End LSN to correspond to an end of the log (act 1514). The process then may determine a percentage of the log that is used (act 1516). The percentage may be returned to the calling program. The process may then be completed.

If the calling program receives an unsuccessful write completion notification from the above-mentioned process, and the unsuccessful write completion notification further indicates that the write failed to complete successfully due to a bad sector, then the calling program may avoid doing any input/output, with respect to the log, as much as possible. Assuming, for example, that the medium upon which the log resides is a disk, disks have a number of spare sectors, which may be used when a sector is determined to be bad. The calling program may receive a bad sector notification from the log-related process for writing to the log when no additional spare sectors exist on the disk. At this point, the medium may fail within hours or days.

Figure 16:
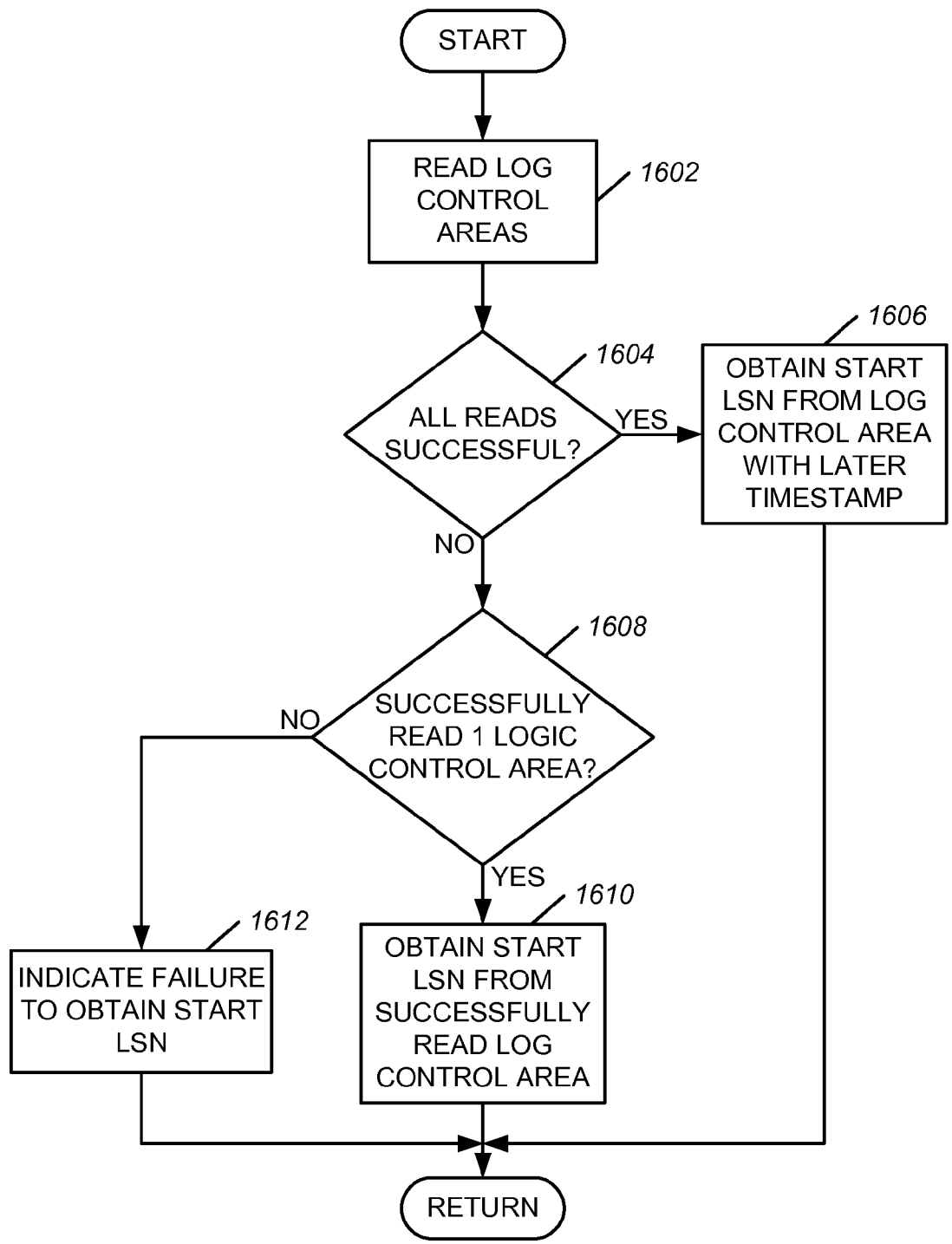

FIG. 16 is a flowchart of an exemplary log-related process for obtaining information from a LCA of a log. The exemplary process assumes that the log has two LCAs. However, in other embodiments, the process may be adjusted to accommodate one LCA or more than two LCAs.

The process may receive a log handle from the calling program. The process may begin by attempting to read all LCAs of a log (act 1602). The process may then determine whether all reads are successful (act 1604). If all reads are successful, then the process may obtain an indication of a logical start of the log (for example, Start LSN) from the LCA with a later logic timestamp (act 1606). The process may then be completed.

If, during act 1604, the process determines that the attempt to read all LCAs is unsuccessful, then the process may determine whether one of the LCAs was successfully read (act 1608). If one of the LCAs was successfully read, then the process may obtain an indication of a logical start of the log (Start LSN) from the successfully read LCA (act 1610). The process may then be completed.

If, during act 1608, the process determines that neither LCA was successfully read, then the process may notify the calling program of a failure to obtain a logical start (for example, Start LSN) of the log (act 1612).

Figure 17:
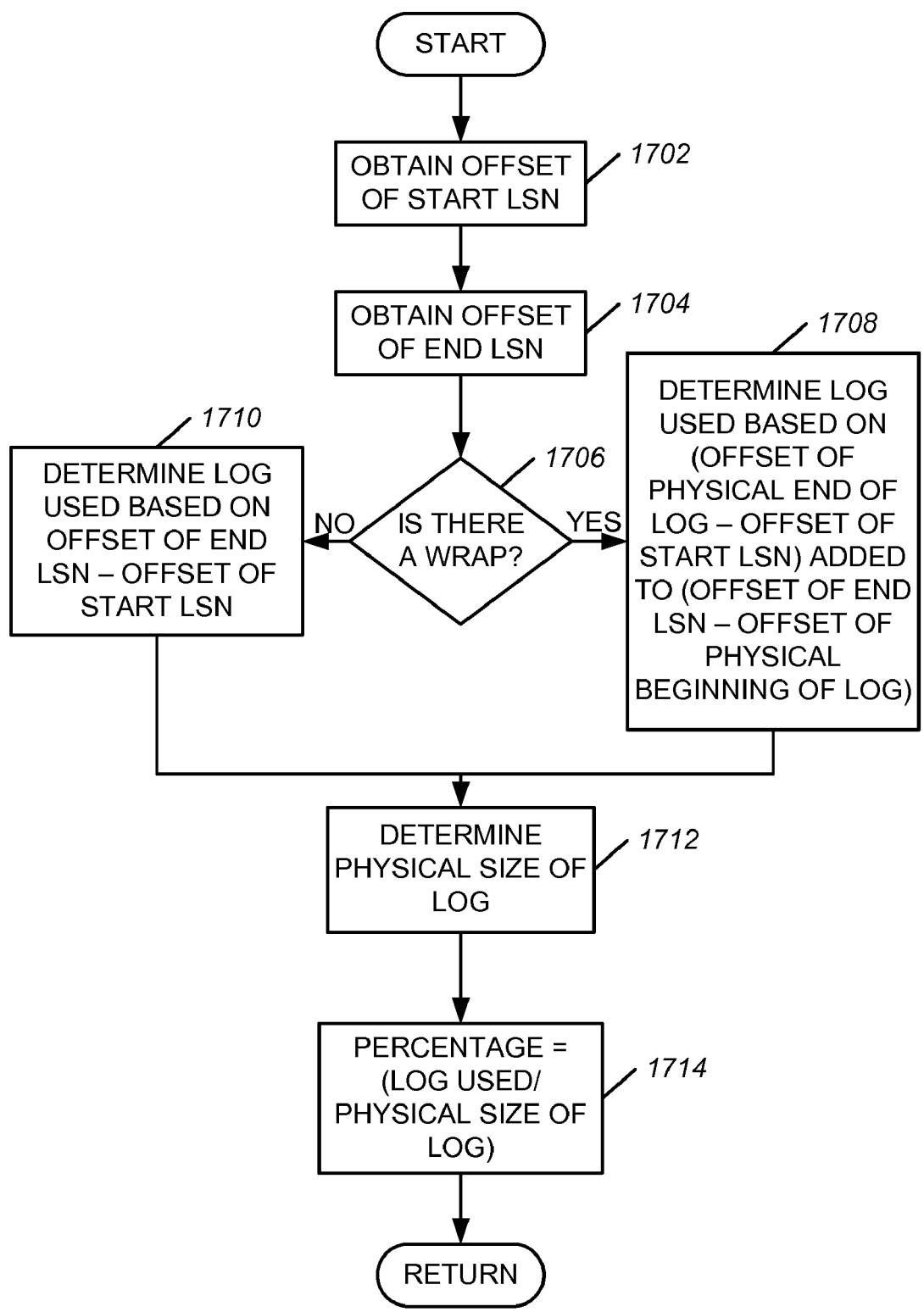

FIG. 17 is a flowchart illustrating an exemplary log-related process for determining a percentage of fullness of a log (or a percentage of the log used). The process may receive a log handle, from the calling program, indicating a particular log.

The process may begin by obtaining an offset portion of Start LSN (act 1702). The process may then obtain an offset portion of End LSN (act 1704). The process may then determine whether a wrapping of the log occurred (act 1706). The process may determine whether the wrapping occurred based on comparing the offset portion of the Start LSN with the offset portion of the End LSN. For example, if the offset portion of the Start LSN is greater than the offset portion of the End LSN, then the wrapping occurred. Alternatively, a wrap count portion of the Start LSN may be compared with a wrap count portion of the End LSN. If the respective wrap count portions are different, then the wrapping occurred.

If the wrapping of the log occurred, then the process may determine an amount of the log used by subtracting the offset portion of Start LSN from an offset of a physical end of the log to produce a first result, by subtracting an offset of a physical beginning of the log from the offset portion of End LSN to produce a second result, and adding the first result and the second result to produce the amount of the log used (act 1708). If the wrapping of the log did not occur, then the process may determine the amount of the log used by subtracting the offset portion of Start LSN from the offset portion of End LSN to produce the amount of the log used (act 1710).

After performing act 1710 or act 1708, the process may determine a physical size of the log by subtracting the offset from the physical beginning of the log from the offset from the physical end of the log (act 1712). The process may then calculate the percentage of the log used (or the percentage of fullness of the log) by dividing the amount of the log used by the physical size of the log (act 1714). The process may then return the percentage of the log used to the calling program.

Figure 18:
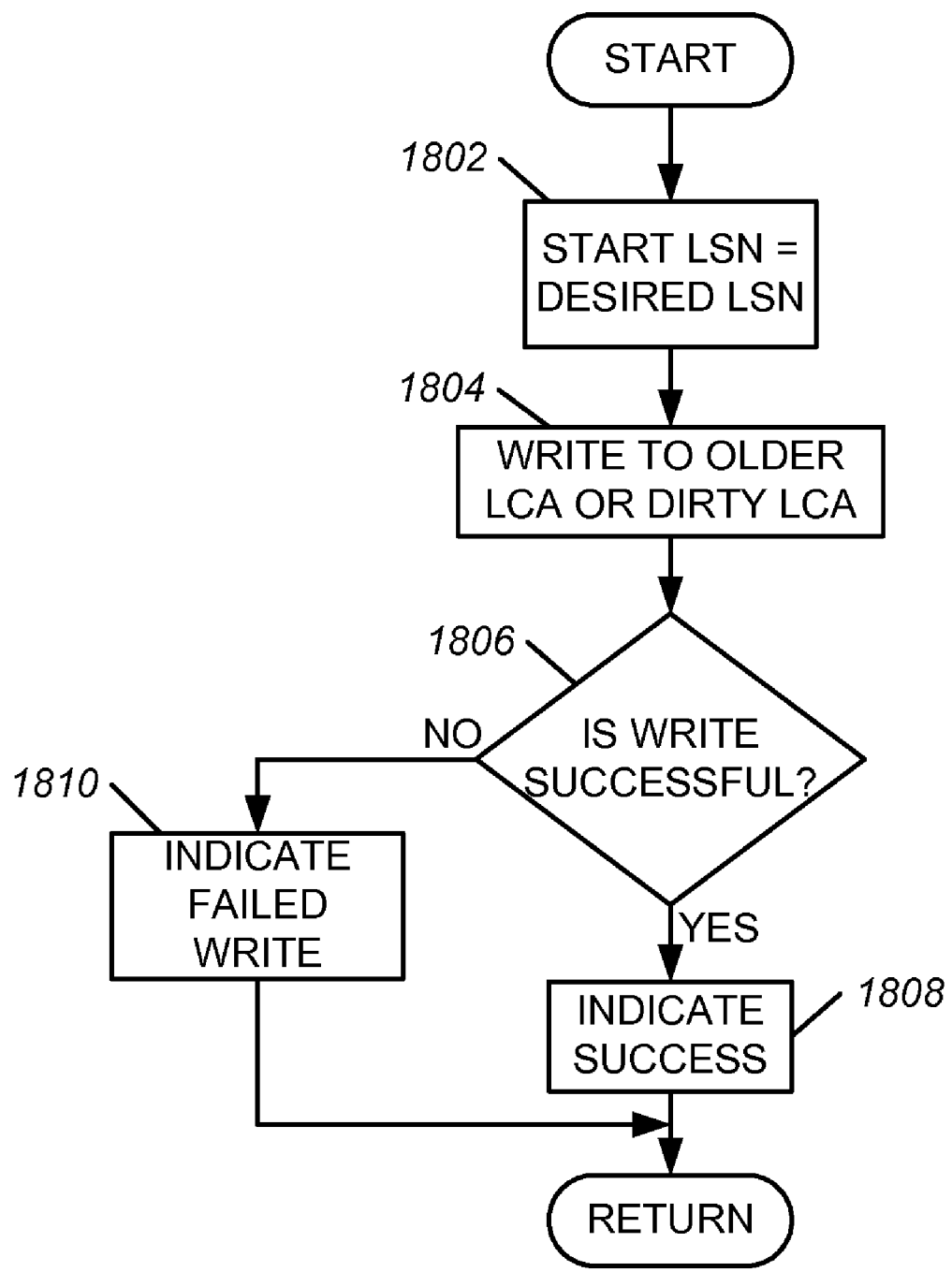

FIG. 18 is a flowchart illustrating an exemplary log-related process for advancing a logical starting address of a log (for example, Start LSN). The calling program may provide a log handle indicating a particular log and a desired LSN, which may be a desired value for Start LSN. The exemplary process assumes that there are two LCAs for the log. However, in other embodiments, a log may have one LCA or more than two LCAs. The exemplary process may be adjusted to accommodate a different number of LCAs.

The process may begin by setting Start LSN to a value of the desired LSN (act 1802). The process may then attempt to write to the older or dirty copy of the LCAs (act 1804). The process may determine whether the writing to the LCA was successful (act 1806). If the process determines that the writing to the LCA was successful, then the process may notify the calling program to indicate that the logical starting address of the log has been advanced successfully (act 1808).

If, during act 1806, the process determines that the writing to the LCA failed, then the process may notify the calling program to indicate that writing to the LCA failed (act 1810).

Alternatively, the process may attempt to write to all LCAs. If at least one of the writes is successful, then the calling program may receive a notification indicating that the write was successfully completed. Otherwise, the calling program may receive a notification indicating that the write failed to complete successfully.

As previously described, with respect to attempting to write to the log and the calling program receiving a notification of a bad sector, the calling program may avoid, as much as possible, doing any input/output regarding the log and may notify a user that the medium in which the log resides may soon fail.

Figure 19:
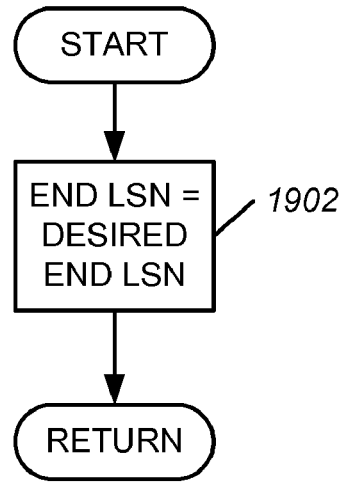

FIG. 19 is a flowchart of an exemplary log-related process for setting a logical end of a log (for example, End LSN). The calling program may provide a log handle to indicate a particular log and a desired value for the logical end of the log (for example, a desired LSN).

The process may begin by obtain the desired value for the logical end of the log (desired LSN) and setting the logical end of the log (End LSN) to the desired value (desired LSN) (act 1902). The process may then be completed.

Figure 20:
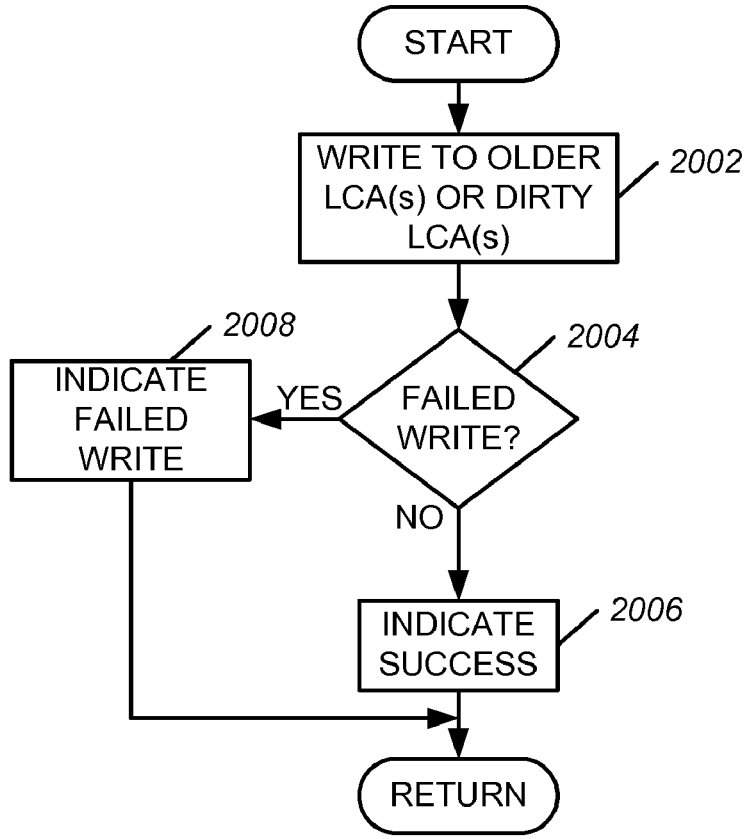

FIG. 20 is a flowchart of an exemplary log-related process for writing host information to a LCA of a log. The calling program may provide a log handle, host information, and a length of the host information to the process. The exemplary process assumes that there are two LCAs for the log. However, in other embodiments, a log may have one LCA or more than two LCAs. The exemplary process may be adjusted to accommodate a different number of LCAs.

The process may begin by obtaining the host information and the length of the host information and attempting to write the host information to the older or dirty copies of the LCAs of the log (act 2002). The process may then determine whether the write failed (act 2004). If the process determines that the write did not fail, then the process may provide a notification to the calling program indicating that the host information was successfully written (act 2006).

If, during act 2004, the process determines that the write to the LCA failed, then the process may provide a notification to the calling program indicating that the setting of the host information failed (act 2008). The calling program may then avoid, as much as possible, doing any input/output regarding the log and may notify a user that the medium, in which the log resides, may soon fail.

Alternatively, the process may attempt to write to all LCAs. If at least one of the writes is successful, then the calling program may receive a notification indicating that the write was successfully completed. Otherwise, the calling program may receive a notification indicating that the write failed to complete successfully.

The above-described log-related processes are only exemplary. In other embodiments, additional, or different log-related processes may be implemented.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described with respect to FIGS. 7-20, or may implement acts in a different order than as shown. Accordingly, the appended claims and their legal equivalents define the invention, rather than any specific examples given.

We claim as our invention:

1. A machine-implemented method for writing to a log in sequentially increasing addresses, the machine-implemented method comprising:
    writing a log entry to a logical end of a log having sequentially increasing addresses, the log entry including an entry metadata portion and a payload data portion, the log including at least one cell, each cell of the at least one cell having a predetermined size for storing a plurality of log entries including a respective cell summary, the respective cell summary initially being empty;
    writing a cell summary of one of the at least one cell when the cell does not have a capacity to store an additional log entry, the cell summary including information describing only log entries of the one of the at least one cell;
    attempting to write a log entry to the log;
    determining whether the attempt to write the log entry failed due to a bad sector;
    writing a bad sector entry to the logical end of the log to indicate a bad sector area of the log when the attempt to write the log entry is determined to have failed due to the bad sector;
    reading a log entry during a performing of a drain read;
    determining whether the read log entry is the bad sector entry;
    writing the bad sector entry to the logical end of the log when the read log entry is determined to be the bad sector entry; and
    advancing a logical start of the log to correspond to another log entry beyond the log entry with the bad sector entry when the read log entry is determined to be the bad sector entry.

2. The machine-implemented method of claim 1, wherein:
    the log is included in a circular storage area on a storage medium,
    each log entry included in the log has a respective position in the log corresponding to a log sequence number, and
    the log sequence number comprises a wrap count portion, indicating a number of times wrapping of the log occurred, and an offset portion, indicating an offset, in a predetermined unit, from a physical beginning of the log.

3. The machine-implemented method of claim 1, wherein the log includes at least one log control area for storing a starting log sequence number corresponding to a first log entry of the log.

4. The machine-implemented method of claim 3, wherein the log includes two log control areas, each of the two log control areas including an indication of the logical start of the log, a first log control area being located at a physical beginning of the log, and a second log control area being located at a physical end of the log.

5. The machine-implemented method of claim 1, wherein:
    the written log entry includes a signature array within the entry metadata portion, and
    the writing a log entry to a logical end of a log further comprises:
    performing one of:
        a first method comprising:
            forming the signature array from a checksum calculated over the log entry, or
        a second method comprising:
            forming the signature array from original contents of at least one predefined byte of each sector of the log entry, and
            storing a sequence number in at least a portion of the at least one predefined byte of each sector of the log entry.

6. The machine-implemented method of claim 5, wherein the storing a sequence number in at least a portion of the at least one predefined byte of each sector of the log entry further comprises:
    storing at least one flag in at least the portion of the at least one predefined byte of each sector of the log entry, the at least one flag including at least one of a first flag indicating a first sector of the log entry, a second flag indicating a middle sector of the log entry, or a third flag indicating a last sector of the log entry.

7. The machine-implemented method of claim 1, further comprising:
reading a second log entry at a given address of the log; and advancing the logical start of the log.

8. The machine-implemented method of claim 1, further comprising:
providing a library including a plurality of log-related processes; and
providing an application program interface for an application program to call ones of the log-related processes, the log-related processes including a process for opening a log, a process for closing a log, a process for reading a log entry, a process for writing a log entry, a process for obtaining a logical start of a log, a process for advancing a logical start of a log, and a process for setting a logical end of a log.

9. A processing device comprising:
at least one processor; and
a memory connected to the at least one processor, the memory including:
instructions for writing a log entry to a logical end of a log, the log entry including an entry metadata portion and a payload data portion, the entry metadata portion including a log sequence number corresponding to a physical position of the log entry within the log, the log sequence number including an offset from a physical beginning of the log in a predefined storage unit, the entry metadata portion further including an array, contents of the array to be used for determining a validity of the log entry, and each sector of the log entry having a predetermined portion for storing a sequence number,
instructions for determining whether the writing a log entry to the logical end of the log failed due to a bad sector,
instructions for writing a bad sector entry to the logical end of the log to indicate a bad sector area of the log when the writing a log entry to the logical end of the log is determined to have failed due to the bad sector,
instructions for performing a drain read from the log, the instructions for performing a drain read further comprising:
instructions for reading a log entry from the log and for determining the validity of the read log entry based, at least in part, on contents of the array included in the entry metadata portion,
instructions for determining whether the read log entry is the bad sector entry;
instructions for writing the bad sector entry to the logical end of the log when the read log entry is determined to be the bad sector entry; and
instructions for advancing a logical start of the log to correspond to another log entry beyond the log entry with the bad sector entry when the read log entry is determined to be the bad sector entry.

10. The processing device of claim 9, wherein the log is included in a circular storage area and the log sequence number further includes a wrap count portion, the wrap count portion including a number of times wrapping of the log in the circular storage area occurs.

11. The processing device of claim 9, wherein the memory further includes:
a library including instructions for performing a plurality of log-related processes,
instructions for providing an application program interface to enable a calling program to call ones of the log-related processes, the log-related processes including a process for reading a log entry from a log and a process for writing a log entry to a log,
instructions for the calling program to call the process for writing a log entry to a log and for receiving an indication of success or an indication of failure with respect to the writing,
instructions for the calling program to receive the indication of failure indicating failure due to a bad sector, and
instructions for the calling program to call the process for writing a log entry to a log in order to write a bad sector entry to the logical end of the log for which the indication of failure was received indicating a bad sector area of the log, in response to receiving the indication of failure due to a bad sector.

12. The processing device of claim 11, wherein the memory further comprises:
instructions for the calling program to call the process for reading a log entry in order to perform a drain read,
instructions for the calling program to determine whether the read log entry is a bad sector entry, and
instructions for the calling program to call the process for writing a log entry to a log to write the bad sector record to a logical end of the log when the read log entry is determined to be the bad sector entry.

13. The processing device of claim 9, wherein
the log includes a plurality of cells, each of the plurality of cells being for storing a plurality of log entries and a cell summary including information about the plurality of the log entries stored in the cell.

14. The processing device of claim 13, wherein the memory further comprises:
instructions for reading, after a system restart, a respective cell summary of each of the plurality of cells until an invalid cell summary is found,
instructions for reading the log, beginning from a log entry of a cell following a last found valid cell summary, until no additional valid log entries are found,
instructions for setting the logical end of the log to correspond to an end of a last found valid log entry, and
instructions for enabling the log for writing after setting the logical end of the log.

15. The processing device of claim 13, wherein the memory further comprises:
instructions for determining whether a cell of the plurality of cells is capable of storing an additional log entry, and
instructions for writing a cell summary to the cell upon determining that the cell does not have a capacity to store an additional log entry.

16. A tangible machine-readable medium having instructions stored thereon for at least one processor, the instructions comprising:
instructions for writing a log entry to a logical end of a log, the log entry being included in a cell capable of storing a plurality of log entries,
instructions for determining whether the cell has a capacity for storing an additional log entry,
instructions for writing a cell summary to the cell when the cell is determined not to have the capacity for storing the additional log entry, the cell summary including information describing only the plurality of log entries stored in the cell,
instructions for accessing a log control area of the log including a logical start of the log
instructions for determining whether the writing a log entry to the logical end of the log failed due to a bad sector,
instructions for writing a bad sector entry to the logical end of the log to indicate a bad sector area of the log when the writing a log entry to the logical end of the log is determined to have failed due to the bad sector, instructions for performing a drain read from the log, the instructions for performing the drain read further comprising:
  instructions for reading a log entry from the log,
  instructions for determining whether the read log entry is the bad sector entry;
  instructions for writing the bad sector entry to the logical end of the log when the read log entry is determined to be the bad sector entry; and
  instructions for advancing a logical start of the log to correspond to another log entry beyond the log entry with the bad sector entry when the read log entry is determined to be the bad sector entry.

17. The tangible machine-readable medium of claim 16, wherein:
  the log is included in a circular storage area, and
  each log entry has an entry metadata portion and a payload data portion, the entry metadata portion including a log sequence number corresponding to a respective log entry, the log sequence number including a wrap count portion, indicating a number of times wrapping past a physical end of the log occurred, and an offset portion, indicating an offset from a physical beginning of the log.

18. The tangible machine-readable medium of claim 16, wherein the log includes at least two log control areas.

19. The tangible machine-readable medium of claim 16, wherein the instructions further comprise:
  instructions for a providing a plurality of log-related processes, the log-related processes being callable by a calling application program and including a process for opening a log, a process for closing a log, a process for reading a log entry, a process for writing a log entry, a process for obtaining a logical start of a log, a process for advancing a logical start of a log, and a process for setting a logical end of a log.

20. The tangible machine-readable medium of claim 16, wherein the cell has a predefined size and the cell summary has a predefined position within the cell.

\* \* \* \* \*